US010992630B1

(12) United States Patent
Kaczmarek et al.

(10) Patent No.: US 10,992,630 B1
(45) Date of Patent: Apr. 27, 2021

(54) TECHNIQUES FOR EMAIL PORTABILITY

(71) Applicant: VERISIGN, INC., Reston, VA (US)

(72) Inventors: Michael Kaczmarek, Great Falls, VA (US); Sameer Thakar, Leesburg, VA (US); Eric Osterweil, Fairfax, VA (US)

(73) Assignee: VERISIGN, INC., Reston, VA (US)

( * ) Notice: Subject to any disclaimer, the term of this patent is extended or adjusted under 35 U.S.C. 154(b) by 195 days.

(21) Appl. No.: 15/877,114

(22) Filed: Jan. 22, 2018

(51) Int. Cl.
*H04L 12/58* (2006.01)
*H04L 29/12* (2006.01)

(52) U.S. Cl.
CPC .............. *H04L 51/28* (2013.01); *H04L 51/04* (2013.01); *H04L 61/1511* (2013.01)

(58) Field of Classification Search
CPC ....... H04L 51/28; H04L 51/04; H04L 61/1511
USPC ......................................................... 709/206
See application file for complete search history.

(56) References Cited

U.S. PATENT DOCUMENTS

| | | | | |
|---|---|---|---|---|
| 6,963,928 B1* | 11/2005 | Bagley | .............. | H04L 29/12122 709/206 |
| 6,963,929 B1* | 11/2005 | Lee | .................. | H04L 29/12009 370/351 |
| 7,136,932 B1* | 11/2006 | Schneider | ......... | H04L 29/12594 709/245 |
| 8,458,264 B1* | 6/2013 | Lee | .......................... | H04L 51/28 709/206 |
| 8,667,074 B1* | 3/2014 | Farkas | ..................... | H04L 51/12 709/206 |
| 2002/0073233 A1* | 6/2002 | Gross | ................ | H04L 29/12066 709/245 |
| 2003/0115280 A1* | 6/2003 | Quine | .................. | H04L 29/1215 709/207 |
| 2005/0216567 A1* | 9/2005 | Ruiz | ........................ | H04L 51/28 709/206 |
| 2008/0040133 A1* | 2/2008 | Foth | ........................ | G06Q 10/08 705/338 |
| 2011/0225246 A1* | 9/2011 | Bayles | ................. | G06Q 10/107 709/206 |
| 2014/0074948 A1* | 3/2014 | Farkas | ..................... | H04L 51/12 709/206 |
| 2015/0381561 A1* | 12/2015 | Meltzer | ................. | H04L 61/307 709/206 |
| 2016/0098732 A1* | 4/2016 | Burton | ............... | G06Q 30/0201 705/7.29 |
| 2016/0119264 A1* | 4/2016 | Humphreys | ............ | H04L 51/14 709/206 |

* cited by examiner

*Primary Examiner* — Minh Chau Nguyen
(74) *Attorney, Agent, or Firm* — Artegis Law Group, LLP

(57) ABSTRACT

Various embodiments disclosed herein provide techniques for transmitting an email message over a network. An email forwarding application executing on an email server receives a first request from a first device within the network to resolve an email address of an email recipient, where the email address is associated with a first domain. The email forwarding application determines that the email recipient is associated with a second domain. The email forwarding application transmits, to the first device, a first response to the first request that identifies the email recipient and the second domain.

20 Claims, 8 Drawing Sheets

TECHNIQUES FOR EMAIL PORTABILITY

BACKGROUND OF THE DISCLOSURE

Field of the Various Embodiments

The various embodiments relate generally to computer networks and, more specifically, to techniques for email portability.

Description of the Related Art

Email messaging is a common mechanism for users of computing devices to communicate with one another. To communicate via email messaging, a user subscribes to a particular email service provider. Such users are referred to herein as "subscribers" of email communications services. With email messaging, a sender of an email message types or enters the email message into an email message software application, specifies the email address of an intended recipient of the email message, and then commands the email message software application to transmit the email message to the email address of the intended recipient. Typically, the email address is of the form, recipient@domain.tld, where "recipient" is a username associated with the email message recipient (also referred to herein as the email recipient), "domain" is a domain name of an email server associated with the email message recipient, and "tld" is a top level domain, such as .com or .net.

After the email message has been transmitted by the email message software application, the email message is routed, via a network, to a server machine used by an email server responsible for the domain name "domain.tld." Upon receipt, the server machine analyzes the email address of the recipient to determine whether the email address is valid. If the email address is valid, then the server machine stores the email message in memory and/or disk storage so that the recipient is able to read the email message. If the email address is not valid, then the server machine rejects and discards the email message.

For various reasons, the email address of a particular email subscriber can change one or more times over the course of time. In one example, the subscriber could move out of the service area of one email service provider and into the service area of a different email service provider. In another example, the subscriber could change from a first email service provider to a second email service provider, if the second email service were to provide better service terms, cost, and/or customer support relative to the first email service provider. Regardless of the reason, once the new email address is acquired, the subscriber advises other subscribers, such as individual persons and businesses, of the new email address. From that point on, those other subscribers use the new email address when sending email messages to the subscriber.

One drawback of the above approach is that manually informing other subscribers of an email address change is quite burdensome and subject to error. For example, a subscriber could forget to send the new email address to certain subscribers, or certain subscribers may fail to update their records with the new email address even if received. In such cases, some email messages intended for the subscriber may be transmitted to the old email address rather than the new email address. If so, then email messages sent to the old email address may never be received by the subscriber that is the intended recipient. Further, if the old email address is subsequently assigned to a new subscriber, then the new subscriber may start receiving email messages intended for the original subscriber. If any of those email messages contains sensitive or confidential information, then the original subscriber (i.e., the intended recipient) may suffer a loss of privacy or a breach in computer security.

As the foregoing illustrates, what is needed in the art are more effective ways for transmitting email messages to subscribers who change service providers but wish to retain their email addresses.

SUMMARY OF THE VARIOUS EMBODIMENTS

Various embodiments of the present application set forth a method for transmitting an email message over a network. The method includes receiving a first request from a first device within the network to resolve an email address of an email recipient, where the email address is associated with a first domain. The method further includes determining that the email recipient is associated with a second domain. The method further includes transmitting, to the first device, a first response to the first request that identifies the email recipient and the second domain.

Other embodiments include, without limitation, a computer-readable medium including instructions for performing one or more aspects of the disclosed techniques, as well as a computing device for performing one or more aspects of the disclosed techniques.

At least one advantage of at least one of the disclosed techniques is that an email address associated with a particular subscriber of email communications services does not need to change when that subscriber changes from a first email services provider to a second email services provider. Accordingly, the subscriber does not need to advise other subscribers of a change in email address when the subscriber switches email services providers. Among other things, email messages that are transmitted to the email address associated with the first email service provider are received by the subscriber as the intended recipient, even though the subscriber has switched to the second email service provider. Notably, at least one of the disclosed techniques helps ensure that email messages transmitted to the email address associated with the first email service provider are routed to the intended recipient, and not routed to an unintended recipient, thereby improving privacy and addressing data security concerns surrounding email communications.

BRIEF DESCRIPTION OF THE DRAWINGS

So that the manner in which the above recited features can be understood in detail, a more particular description of the various embodiments is illustrated in the appended drawings. It is to be noted, however, that the appended drawings illustrate only typical embodiments and are therefore not to be considered limiting of the scope, for the contemplated embodiments may admit to other equally effective embodiments.

DETAILED DESCRIPTION

In the following description, numerous specific details are set forth to provide a more thorough understanding of described embodiments. However, it will be apparent to one of skill in the art that the described embodiments may be practiced without one or more of these specific details.

System Overview

Figure 1:
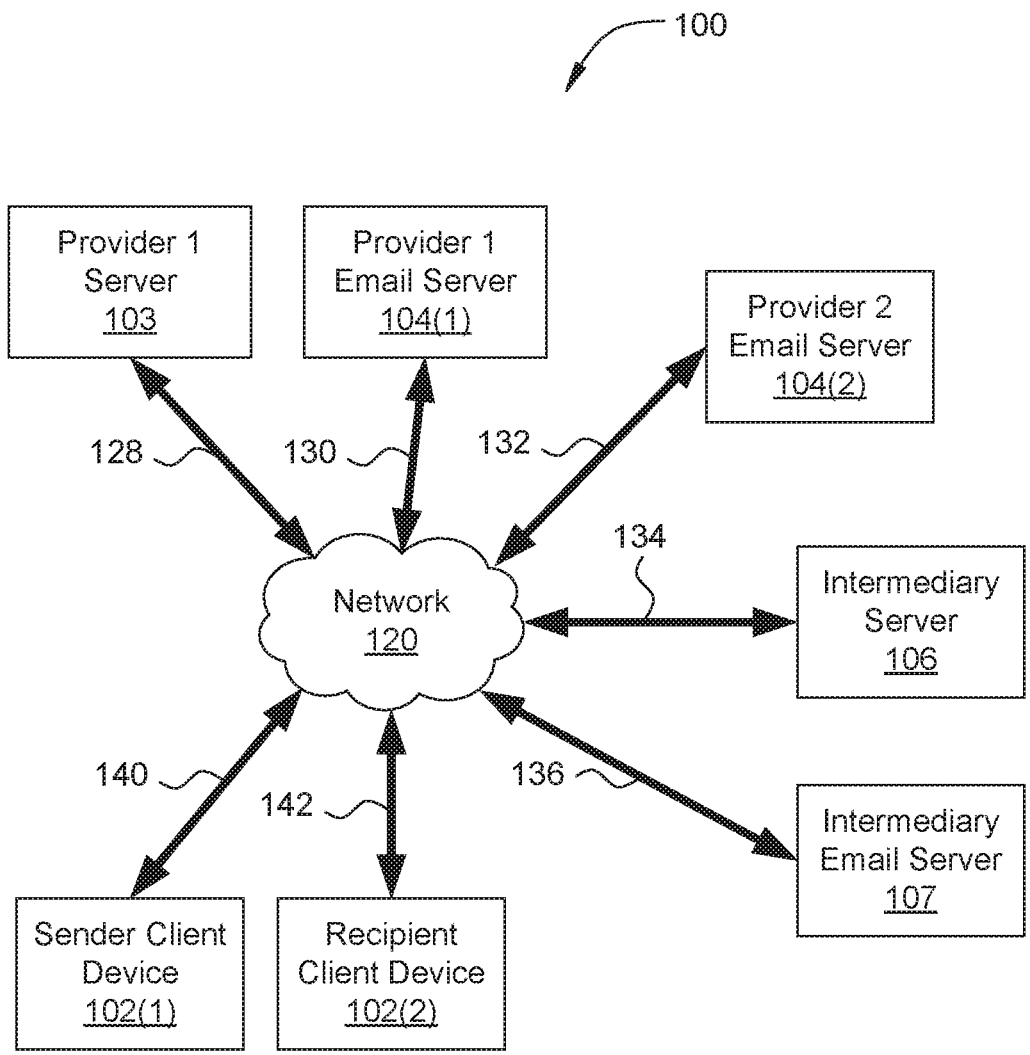
FIG. 1 illustrates a system configured to implement one or more aspects of an embodiment.

FIG. 1 illustrates a system 100 configured to implement one or more aspects of an embodiment. As shown, the system includes, without limitation, sender client device 102(1), recipient client device 102(2), provider 1 server 103, provider 1 email server 104(1), provider 2 email server 104(2), intermediary server 106, and intermediary email server 107 in communication with each other via a network 120. Network 120 may be any suitable environment to enable communications among remote or local computer systems and computing devices, including, without limitation, cross connect systems within a data center, dedicated low-latency networks, LANs (Local Area Networks), and internet-based WANs (Wide Area Networks).

Each of sender client device 102(1) and recipient client device 102(2) includes, without limitation, a computing device that may be a personal computer, video game console, personal digital assistant, mobile phone, mobile device, or any other device suitable for implementing one or more aspects of the described embodiments. Illustratively, sender client device 102(1) and recipient client device 102(2) communicate over network 120 via communications links 140 and 142, respectively. Communications links 140 and 142 may be any technically feasible communication channel, including, without limitation, point-to-point communications channels, one or more LANs, and/or one or more internet-based WANs. Sender client device 102(1) and recipient client device 102(2) transmit network messages that include requests to send and receive email messages from one another, where each email message includes, among other things, the email address associated with the email message intended recipient. Typically, the email address is of the form recipient@domain.tld, where "recipient" is a username associated with the email message intended recipient, "domain" is a domain name of an email server 104 associated with the email message recipient, and "tld" is a top level domain, such as .com or .net, associated with the email server 104.

In one example, sender client device 102(1) could transmit an email message via communications link 140 on behalf of an email message sender associated with sender client device 102(1). The email message would include the email address of an email message recipient associated with recipient client device 102(2). The email message could be processed via one or more of provider 1 server 103, provider 1 email server 104(1), provider 2 email server 104(2), intermediary server 106, and intermediary email server 107, as further described herein. After this processing of the email message, recipient client device 102(2) would receive the email message via communications link 142 for retrieval by the email message recipient.

Provider 1 server 103 includes, without limitation, a computing device that may be a standalone server, a cluster or "farm" of servers, one or more network appliances, or any other device suitable for implementing one or more aspects of the described embodiments. Provider 1 server 103 communicates over network 120 via communications link 128. Communications link 128 may be any technically feasible communication channel, including, without limitation, point-to-point communications channels, one or more LANs, and/or one or more internet-based WANs. In some embodiments, provider 1 server 103 may be an administrative domain name system (DNS) server. According to an embodiment, provider 1 server 103 is configured to receive and service DNS lookup requests, also referred to herein as DNS requests. Provider 1 server 103 is further configured to transmit DNS responses. More specifically, provider 1 server 103 is configured to receive and service a DNS request to resolve an email address associated with an email message intended recipient into a corresponding internet protocol (IP) address of the provider 1 email server 104(1) or provider 2 email server 104(2) associated with the email message intended recipient. As used herein, "resolve" refers to the combination and componentization of the translation from a "left-hand side" (or user inbox name) and the DNS domain name of the email address.

In operation, provider 1 server 103 receives DNS lookup requests to resolve various domains for email addresses associated with provider1_domain.tld. For example, the DNS lookup request could include a request to resolve the email address recipient@provider1_domain. If a particular DNS lookup request is associated with a recipient serviced by provider1_domain, then provider 1 server 103 responds by transmitting a DNS response that acknowledges that the recipient is serviced by provider1_domain.

If, on the other hand, the particular DNS lookup request is associated with a recipient serviced by provider1_domain, then the DNS lookup request may, nevertheless, be associated with a recipient who is covered by a mail exchange (MX) record that specifies a rule corresponding to a set of additional operations that should be taken to resolve the email address recipient@provider1_domain. In such cases, provider 1 server 103 responds by transmitting a DNS response that identifies the email service provider as specified by the MX record. For example, email messages for the email address recipient@provider1_domain.tld could be directed to provider2_domain.tld. Therefore, if provider 1 server 103 receives a DNS lookup request for recipient@provider1_domain.tld, then provider 1 server 103 would transmit a message to sender client device 102(1) identifying provider2_domain.tld as the email service provider for the intended recipient.

Each of provider 1 email server 104(1) and provider 2 email server 104(2) includes, without limitation, a computing device that may be a standalone server, a cluster or "farm" of servers, one or more network appliances, or any other device suitable for implementing one or more aspects of the described embodiments. Provider 1 email server 104(1) and provider 2 email server 104(2) communicate over network 120 via communications links 130 and 132, respectively. Communications links 130 and 132 may be any technically feasible communication channel, including, without limitation, point-to-point communications channels, one or more LANs, and/or one or more internet-based WANs. In general, each of provider 1 email server 104(1)

and provider 2 email server 104(2) is configured to receive and service (for example, and without limitation, categorizing, storing, transmitting, etc.) email messages on behalf of email message senders and email message recipients.

Intermediary server 106 includes, without limitation, a computing device that may be a standalone server, a cluster or "farm" of servers, one or more network appliances, or any other device suitable for implementing one or more aspects of the described embodiments. Intermediary server 106 communicates over network 120 via communications link 134. Communications link 134 may be any technically feasible communication channel, including, without limitation, point-to-point communications channels, one or more LANs, and/or one or more internet-based WANs. In some embodiments, intermediary server 106 may be a DNS server. As further described herein, intermediary server 106 is configured to receive and service a DNS lookup request to resolve an email address associated with an email message recipient into a corresponding internet protocol (IP) address of provider 1 email server 104(1) or provider 2 email server 104(2) associated with the email message intended recipient.

Intermediary email server 107 includes, without limitation, a computing device that may be a standalone server, a cluster or "farm" of servers, one or more network appliances, or any other device suitable for implementing one or more aspects of the described embodiments. Intermediary email server 107 communicates over network 120 via communications links 136. Communications link 136 may be any technically feasible communication channel, including, without limitation, point-to-point communications channels, one or more LANs, and/or one or more internet-based WANs. In general, intermediary email server 107 is configured to receive and service email messages on behalf of email message senders and email message intended recipients.

Several techniques for delivering an email message transmitted by a sender associated with sender client device 102(1) to an intended recipient associated with recipient client device 102(2) are now described in further detail.

In a first technique, sender client device 102(1) transmits a message, such as an email message to provider 1 email server 104(1), where the message is directed to an email address associated with recipient client device 102(2). The email address is of the form recipient@provider1_domain.tld. Upon receiving the message, provider 1 email server 104(1) transmits a DNS lookup request to provider 1 server 103. In some embodiments, provider 1 server 103 may be a DNS server. The DNS lookup request includes a request to resolve a domain associated with the email address of the intended recipient of the message, such as recipient@provider1_domain.tld. Provider 1 server 103 retrieves one or more MX records from a DNS "zone file" associated with provider 1. The DNS zone file for provider 1 may be stored with DNS zone files for other providers within an MX record database. The DNS zone file for provider 1 includes the following MX records:
10 DNS Zone File: provider1_domain.tld
20 provider1_domain MX mail. provider1_domain
30 recipient._at.provider1_domain MX recipient._at. provider2_ domain.tld Line 10 of the above DNS zone file identifies the DNS zone file as corresponding to the domain provider1_domain.tld. Line 20 of the above DNS zone file specifies a default rule for messages directed to any subscriber associated with provider1_domain. In particular, such messages are directed to mail.provider1_domain for processing, where provider 1 email server 104(1) provides email services for provider1_domain.tld. Line 30 of the above DNS zone file specifies a rule for resolving messages directed to recipient@ provider1_domain. Such messages are directed to recipient@provider2_domain.tld, where provider 2 email server 104(2) provides email services for provider2_domain.tld.

In response to receiving a DNS lookup request directed to recipient@provider1_domain.tld, provider 1 server 103 transmits a DNS response to provider 1 email server 104(1). The DNS response identifies that the message directed to recipient@provider1_domain.tld should be redirected to recipient@provider2_domain.tld. Upon receiving the DNS response, provider 1 email server 104(1) transmits the message to provider 2 email server 104(2). Provider 2 email server 104(2) then delivers the message to recipient client device 102(2).

In a second technique, sender client device 102(1) transmits a message, such as an email message to provider 1 email server 104(1), where the message is directed to an email address associated with recipient client device 102(2). The email address is of the form recipient@provider1_domain.tld. Upon receiving the message, provider 1 email server 104(1) transmits a DNS lookup request to provider 1 server 103. In some embodiments, provider 1 server 103 may be a DNS server. The DNS lookup request includes a request to resolve a domain associated with the email address of the intended recipient of the message, such as recipient@provider1_domain.tld. Provider 1 server 103 retrieves one or more MX records from a DNS "zone file" associated with provider 1. The DNS zone file for provider 1 may be stored with DNS zone files for other providers within an MX record database. The DNS zone file for provider 1 includes the following MX records:
10 DNS Zone File: provider1_domain.tld
20 provider1_domain MX mail.provider1_domain
30 recipient._at.provider1_domain MX<intermediary>

Line 10 of the above DNS zone file identifies the DNS zone file as corresponding to the domain provider1_domain.tld. Line 20 of the above DNS zone file specifies the default rule for messages directed to any subscriber associated with provider1_domain. In particular, such messages are directed to mail.provider1_domain for processing. Line 30 of the above DNS zone file specifies a rule for resolving messages directed to recipient@provider1_domain. Such messages are directed to <intermediary>, where intermediary server 106 provides DNS responses back to provider 1 server 103. As detailed below, in this second technique, in response to receiving a DNS response back from intermediary server 106, provider 1 server 103 sends the DNS response to provider 1 email server 104(1). Upon receiving the DNS response, provider 1 email server 104(1) delivers the message received from sender client device 102(1) to recipient client device 102(2) via provider 2 email server 104(2).

More specifically, in response to receiving a DNS lookup request directed to recipient@provider1_domain.tld, provider 1 server 103 transmits a DNS lookup request to intermediary server 106. In some embodiments, intermediary server 106 may be a DNS server. The DNS lookup request includes a request to resolve a domain associated with the email address of the intended recipient of the message, such as recipient@provider1_domain.tld. Upon receiving the DNS lookup request, intermediary server 106 searches a forwarding database to determine the current email address for recipient@provider1_domain.tld. For example, the forwarding database could have a record of the form:

recipient@provider1_domain.tld=recipient@provider2_domain.tld
where this record specifies that email directed to recipient@provider1_domain.tld should now be directed to recipient@provider2_domain.tld. Based on this forwarding database record, intermediary server 106 transmits a DNS response to provider 1 server 103. The DNS response identifies that the message directed to recipient@provider1_domain.tld should be redirected to recipient@provider2_domain.tld. Provider 1 server 103, in turn, transmits a DNS response to provider 1 email server 104(1). Likewise, the DNS response identifies that the message directed to recipient@provider1_domain.tld should be redirected to recipient@ provider2_domain.tld. Upon receiving the DNS response, provider 1 email server 104(1) transmits the message to provider 2 email server 104(2). Provider 2 email server 104(2) then delivers the message to recipient client device 102(2).

In a third technique, sender client device 102(1) transmits a message, such as an email message to provider 1 email server 104(1), where the message is directed to an email address associated with recipient client device 102(2). The email address is of the form recipient@provider1_domain.tld. Upon receiving the message, provider 1 email server 104(1) transmits a DNS lookup request to provider 1 server 103. In some embodiments, provider 1 server 103 may be a DNS server. The DNS lookup request includes a request to resolve a domain associated with the email address of the intended recipient of the message, such as recipient@provider1_domain.tld. Provider 1 server 103 retrieves one or more mail exchange (MX) records from a DNS "zone file" associated with provider 1. The DNS zone file for provider 1 may be stored with DNS zone files for other providers within an MX record database. The DNS zone file for provider 1 includes the following MX records:
10 DNS Zone File: provider1_domain.tld
20 provider1_domain MX mail.provider1_domain
30 recipient._at.provider1_domain MX<intermediary>

Line 10 of the above DNS zone file identifies the DNS zone file as corresponding to the domain provider1_domain.tld. Line 20 of the above DNS zone file specifies the default rule for email messages directed to any subscriber associated with provider1_domain. In particular, such email messages are directed to mail.provider1_domain for processing. Line 30 of the above DNS zone file specifies a rule for resolving email messages directed to recipient@provider1_domain. Such email messages are directed to <intermediary>, where intermediary server 106 provides DNS responses back to intermediary email server 107. As detailed below, in this third technique, in response to receiving a DNS response back from intermediary server 106, intermediary email server 107 delivers the message received from sender client device 102(1) to recipient client device 102(2) via provider 2 email server 104(2).

More specifically, in response to receiving a DNS lookup request directed to recipient@provider1_domain.tld, provider 1 server 103 transmits a DNS response to provider 1 email server 104(1). The DNS response identifies that the message directed to recipient@provider1_domain.tld should be redirected to <intermediary>. Upon receiving the DNS response, provider 1 email server 104(1) transmits the message to intermediary email server 107.

In response to receiving the message, intermediary email server 107 transmits a DNS lookup request to intermediary server 106. In some embodiments, intermediary server 106 may be a DNS server. The DNS lookup request includes a request to resolve a domain associated with the email address of the intended recipient of the message, such as recipient@provider1_domain.tld. Upon receiving the DNS lookup request, intermediary server 106 searches a forwarding database to determine the current email address for recipient@provider1_domain.tld. For example, the forwarding database could have a record of the form:
recipient@provider1_domain.tld=recipient@provider2_domain.tld
where this record specifies that email directed to recipient@provider1_domain.tld should now be directed to recipient@provider2_domain.tld. Based on this forwarding database record, intermediary server 106 transmits a DNS response to intermediary email server 107. The DNS response identifies that the message directed to recipient@provider1_domain.tld should be redirected to recipient@provider2_domain.tld. Upon receiving the DNS response, intermediary email server 107 transmits the message to provider 2 email server 104(2). Provider 2 email server 104(2) then delivers the message to recipient client device 102(2).

In a fourth technique, sender client device 102(1) transmits a message, such as an email message to provider 1 email server 104(1), where the message is directed to an email address associated with recipient client device 102(2). The email address is of the form recipient@provider1_domain.tld. Upon receiving the message, provider 1 email server 104(1) transmits a DNS lookup request to provider 1 server 103. In some embodiments, provider 1 server 103 may be a DNS server. The DNS lookup request includes a request to resolve a domain associated with the email address of the intended recipient of the message, such as recipient@provider1_domain.tld. Provider 1 server 103 retrieves one or more MX records from a DNS "zone file" associated with provider 1. The DNS zone file for provider 1 may be stored with DNS zone files for other providers within an MX record database. The DNS zone file for provider 1 includes the following MX records:
10 DNS Zone File: provider1_domain.tld
20 provider1_domain MX mail.provider1_domain
30 recipient._at.provider1_domain MX<intermediary>

Line 10 of the above DNS zone file identifies the DNS zone file as corresponding to the domain provider1_domain.tld. Line 20 of the above DNS zone file specifies the default rule for email messages directed to any subscriber associated with provider1_domain. In particular, such email messages are directed to mail.provider1_domain for processing. Line 30 of the above DNS zone file specifies a rule for resolving email messages directed to recipient@provider1_domain. Such email messages are directed to <intermediary>, where intermediary server 106 provides DNS responses back to provider 1 server 103 as well as intermediary email server 107. As detailed below, in this fourth technique, in response to receiving a DNS response back from intermediary server 106, provider 1 server 103 sends the DNS response to provider 1 email server 104(1). Upon receiving the DNS response, provider 1 email server 104(1) directs the message received from sender client device 102(1) to intermediary email server 107, which then performs a DNS look-up via intermediary server 106. Upon receiving a DNS response back from intermediary server 106, intermediary email server 107 delivers the message received from sender client device 102(1) to recipient client device 102(2) via provider 2 email server 104(2).

More specifically, in response to receiving a DNS lookup request directed to recipient@provider1_domain.tld, provider 1 server 103 transmits a DNS lookup request to intermediary server 106. In some embodiments, intermediary server 106 may be a DNS server. The DNS lookup request includes a request to resolve a domain associated with the email address of the intended recipient of the message, such as recipient@provider1_domain.tld. Upon receiving the DNS lookup request, intermediary server 106 searches a forwarding database to determine the current email address for recipient@provider1_domain.tld. For example, the forwarding database could have a record of the form:

recipient@provider1_domain.tld=recipient@intermediary_domain.tld where this record specifies that email directed to recipient@provider1_domain.tld should now be directed to recipient@intermediary_domain.tld. Based on this forwarding database record, intermediary server 106 transmits a DNS response to provider 1 server 103. The DNS response identifies that the message directed to recipient@provider1_domain.tld should be redirected to recipient@intermediary_domain.tld. Provider 1 server 103, in turn, transmits a DNS response to provider 1 email server 104(1). Likewise, the DNS response identifies that the message directed to recipient@provider1_domain.tld should be redirected to recipient@intermediary_domain.tld. Upon receiving the DNS response, provider 1 email server 104(1) transmits the message to intermediary email server 107.

In response to receiving the message, intermediary email server 107 transmits a DNS lookup request to intermediary server 106. The DNS lookup request includes a request to resolve a domain associated with the email address of the intended recipient of the message, such as recipient@intermediary_domain.tld. Upon receiving the DNS lookup request, intermediary server 106 searches a forwarding database to determine the current email address for recipient@intermediary_domain.tld. For example, the forwarding database could have a record of the form:

recipient@intermediary_domain.tld=recipient@provider2_domain.tld where this record specifies that email directed to recipient@intermediary_domain.tld should now be directed to recipient@provider2_domain.tld. Based on this forwarding database record, intermediary server 106 transmits a DNS response to intermediary email server 107. The DNS response identifies that the message directed to recipient@intermediary_domain.tld should be redirected to recipient@provider2_domain.tld. Upon receiving the DNS response, intermediary email server 107 transmits the message to provider 2 email server 104(2). Provider 2 email server 104(2) then delivers the message to recipient client device 102(2).

It will be appreciated that the system shown herein is illustrative and that variations and modifications are possible. In one example, although the system 100 of FIG. 1 is illustrated with a specific number of client devices and various servers, the system 100 could include any technically feasible number of client devices and servers, in any combination, within the scope of the present disclosure. In another example, although not specifically shown, the DNS zone file may include any number and type of additional MX records in any combination. In another example, although the network addresses are described herein as IP addresses, any suitable network address could be employed within the scope of the disclosure.

In another example, intermediary server 106 could be a pool of intermediary servers 106, where any one or more of the intermediary server 106 could intercept and process DNS lookup requests related to email address forwarding. In such cases, the MX record for recipient@provider1_domain.tld would contain a rule specifying that a DNS lookup request and/or the corresponding email message should be forwarded to <intermediary.tld> where intermediary.tld is a domain name. Any of the intermediary servers 106 in the pool of intermediary servers 106 could intercept and process forwarded DNS lookup requests transmitted to intermediary.tld.

Email Portability Via Forwarding of Email Address DNS Lookup Requests

Figure 2:
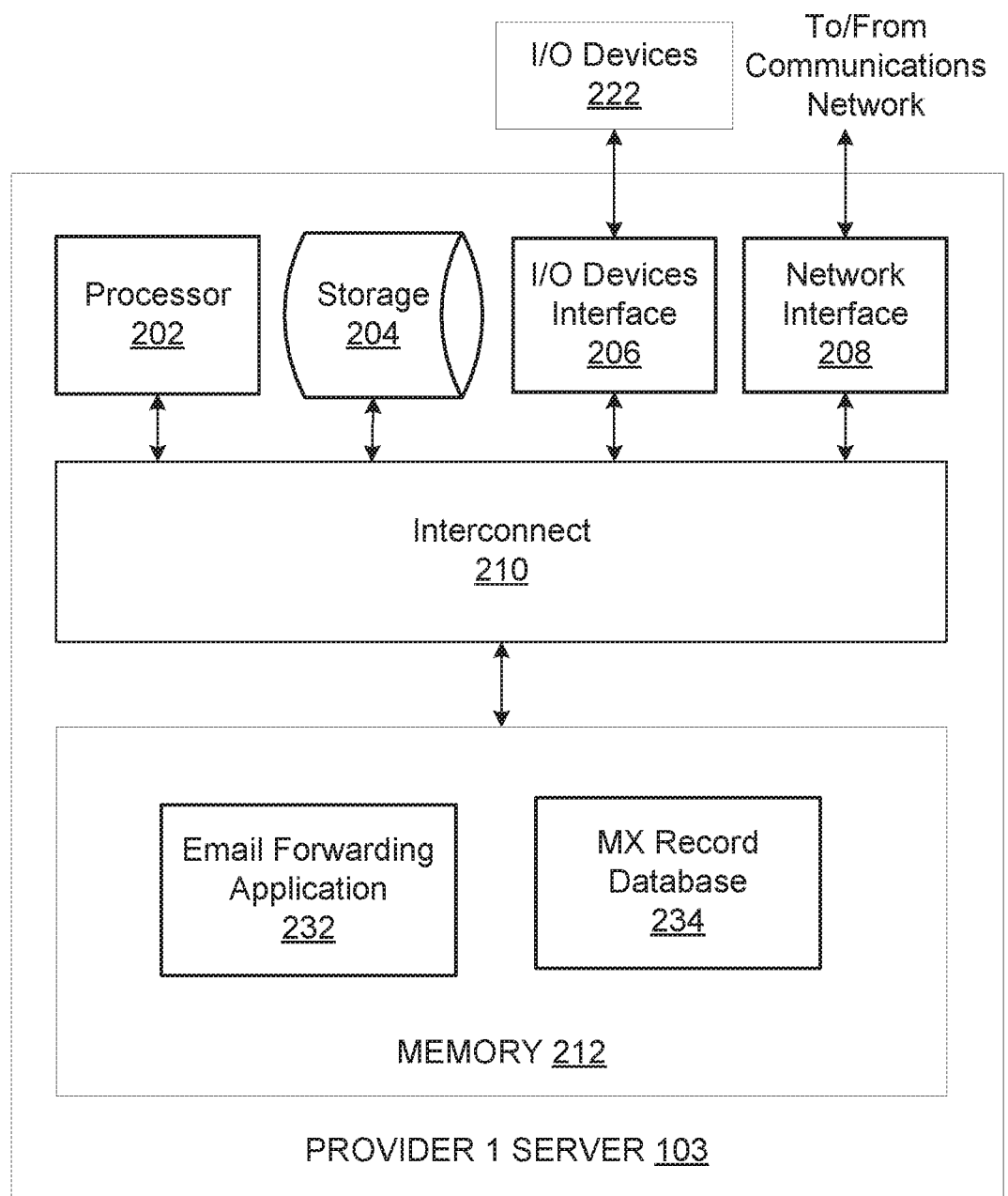
FIG. 2 is a more detailed illustration of the provider 1 server of FIG. 1, according to various embodiments.

FIG. 2 is an illustration of the provider 1 server 103 of FIG. 1, according to various embodiments. As shown, provider 1 server 103 includes, without limitation, a processor or central processing unit (CPU) 202, storage 204, an input/output (I/O) devices interface 206, a network interface 208, an interconnect 210, and a system memory 212.

The processor 202 retrieves and executes programming instructions stored in the system memory 212. Similarly, the processor 202 stores and retrieves application data residing in the system memory 212. The interconnect 210 facilitates transmission, such as of programming instructions and application data, between the processor 202, input/output (I/O) devices interface 206, storage 204, network interface 208, and system memory 212. The I/O devices interface 206 is configured to receive input data from user I/O devices 222. Examples of user I/O devices 222 may include one of more buttons, a keyboard, and/or a mouse or other pointing device. The I/O devices interface 206 may also include, for example, an audio output unit configured to generate an electrical audio output signal, and user I/O devices 222 may further include a speaker configured to generate an acoustic output in response to the electrical audio output signal. Another example of a user I/O device 222 is a display device that generally represents any technically feasible means for generating an image for display. For example, the display device could be a liquid crystal display (LCD) display, CRT display, or DLP display. The display device may be a TV that includes a broadcast or cable tuner for receiving digital or analog television signals.

Processor 202 is included to be representative of a single CPU, multiple CPUs, a single CPU having multiple processing cores, and the like. And the system memory 212 is generally included to be representative of a random access memory. The storage 204 may be a disk drive storage device. Although shown as a single unit, the storage 204 may be a combination of fixed and/or removable storage devices, such as fixed disc drives, floppy disc drives, tape drives, removable memory cards, or optical storage, network attached storage (NAS), or a storage area-network (SAN). Processor 202 communicates to other computing devices and systems via network interface 208, where network interface 208 is configured to transmit and receive data via a communications network.

The system memory 212 includes, without limitation, an email forwarding application 232 and an MX record database 234. The email forwarding application 232, when executed by the processor 202, performs one or more operations associated with the provider 1 server 103 of FIG. 1, as further described herein. In operation, email forwarding application 232 receives DNS lookup requests from client devices, email servers, and other servers to resolve email addresses. In particular, the email forwarding application 232 receives a DNS lookup request for an email address that specifies a recipient name and a domain name that is serviced by an email server, such as provider 1 email server 104(1). Email forwarding application 232 searches the MX record database 234 for the DNS zone file corresponding to the specified domain name. Email forwarding application 232 searches the DNS zone file for an MX record corresponding to the recipient specified by the DNS lookup request. If such an MX record is found, then email forwarding application 232 transmits a DNS response to the client device, email server, or other server that transmitted the DNS lookup request. The DNS response identifies the recipient along with a forwarding domain name corresponding to the recipient. The forwarding domain identifies another domain name associated with the recipient or an intermediary that provides forwarding services for the recipient.

Figure 3:
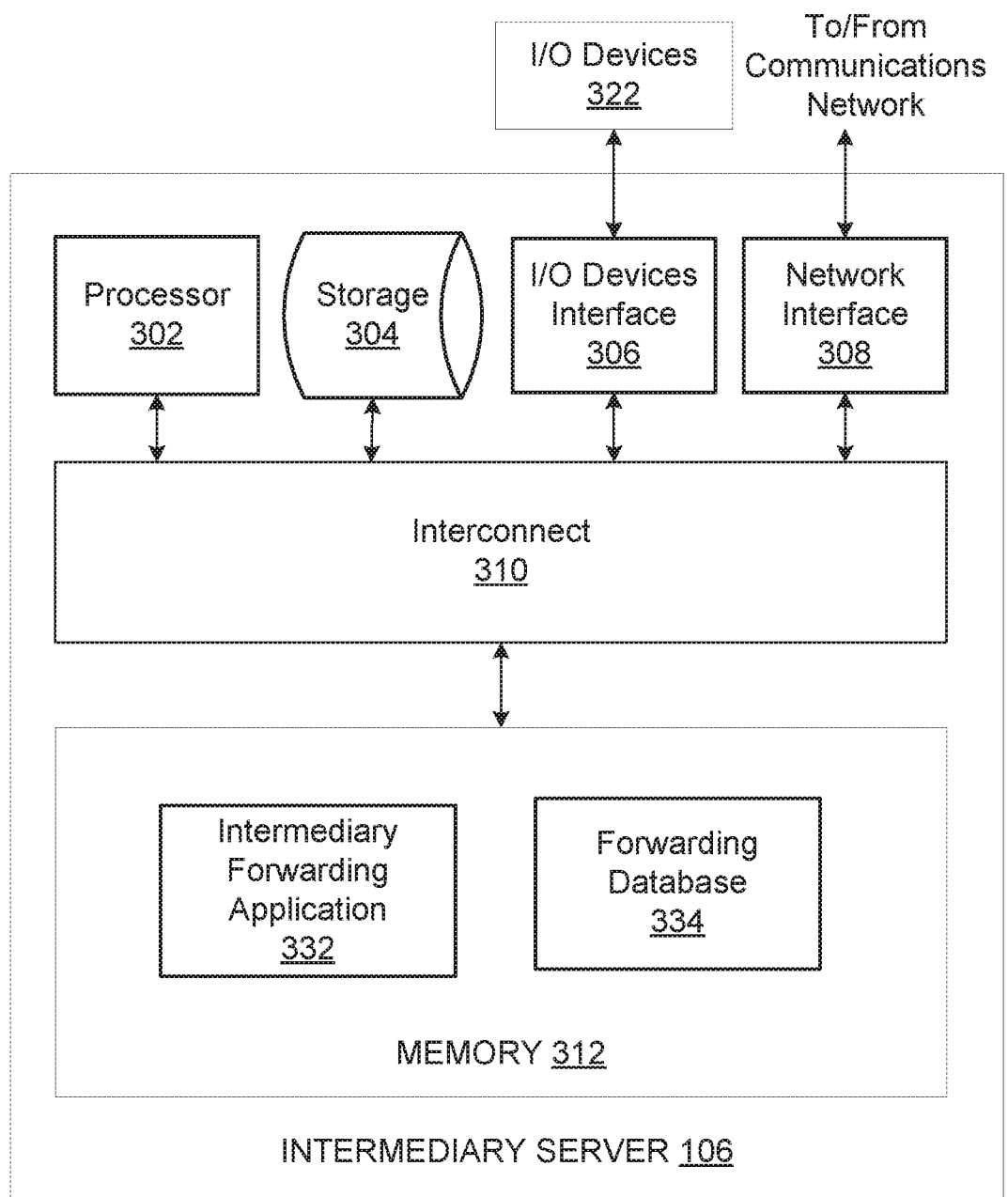
FIG. 3 is a more detailed illustration of the intermediary server of FIG. 1, according to various embodiments.

FIG. 3 is an illustration of the intermediary server 106 of FIG. 1, according to various embodiments. As shown intermediary server 106 includes, without limitation, a central processing unit (CPU) 302, storage 304, an input/output (I/O) devices interface 306, a network interface 308, an interconnect 310, and a system memory 312. Processor 302, storage 304, input/output (I/O) devices interface 306, network interface 308, interconnect 310, and system memory 312 operate substantially the same as the corresponding elements described in conjunction with FIG. 2, except, according to an embodiment, as further described below.

The processor 302 retrieves and executes programming instructions stored in the system memory 312. Similarly, the processor 302 stores and retrieves application data residing in the system memory 312. The interconnect 310 facilitates transmission, for example, such as of programming instructions and application data, between the processor 302, input/output (I/O) devices interface 306, storage 304, network interface 308, and system memory 312. The I/O devices interface 306 is configured to receive input data from user I/O devices 322. Examples of user I/O devices 322 may include one of more buttons, a keyboard, and a mouse or other pointing device. The I/O devices interface 306 may also include an audio output unit configured to generate an electrical audio output signal, and user I/O devices 322 may further include a speaker configured to generate an acoustic output in response to the electrical audio output signal. Another example of a user I/O device 322 is a display device that generally represents any technically feasible means for generating an image for display. For example, the display device could be a liquid crystal display (LCD) display, CRT display, or DLP display. The display device may be a TV that includes a broadcast or cable tuner for receiving digital or analog television signals.

Processor 302 is included to be representative of a single CPU, multiple CPUs, a single CPU having multiple processing cores, and the like. The system memory 312 is generally included to be representative of a random access memory. The storage 304 may be a disk drive storage device. Although shown as a single unit, the storage 304 may be a combination of fixed and/or removable storage devices, such as fixed disc drives, floppy disc drives, tape drives, removable memory cards, or optical storage, network attached storage (NAS), or a storage area-network (SAN). Processor 302 communicates to other computing devices and systems via network interface 308, where network interface 308 is configured to transmit and receive data via a communications network.

The system memory 312 includes, without limitation, an intermediary forwarding application 332 and a forwarding database 334. The intermediary forwarding application 332, when executed by the processor 302, performs one or more operations associated with intermediary server 106 of FIG. 1, as further described herein. In operation, intermediary forwarding application 332 receives DNS forwarding requests from email servers or other servers to identify email addresses. In particular, the intermediary forwarding application 332 receives a DNS lookup request for an email address that specifies a recipient name and a domain name. Intermediary forwarding application 332 searches the forwarding database 334 for a record corresponding to the recipient and domain name specified by the DNS lookup request. If such a record is found, then intermediary forwarding application 332 transmits a DNS response to the email server or other server that transmitted the DNS lookup request. The DNS response identifies the recipient along with a forwarding domain name corresponding to the recipient.

In some embodiments, intermediary server 106 may receive an email message from a sender client device 102(1) for delivery to a recipient, such as recipient@provider1_domain.tld. In response, intermediary server 106 may search a forwarding database to determine the current email address for recipient@provider1_domain.tld. For example, the forwarding database could have a record that specifies that email directed to recipient@provider1_domain.tld should now be directed to recipient@provider2_domain.tld. In response, intermediary server 106 forwards the email message to recipient@provider2_domain.tld, where provider 2 email server 104(2) provides email services for provider2_domain.tld. Provider 2 email server 104(2) receives and processes the email transmitted to recipient@provider2_domain.tld.

Figure 4:
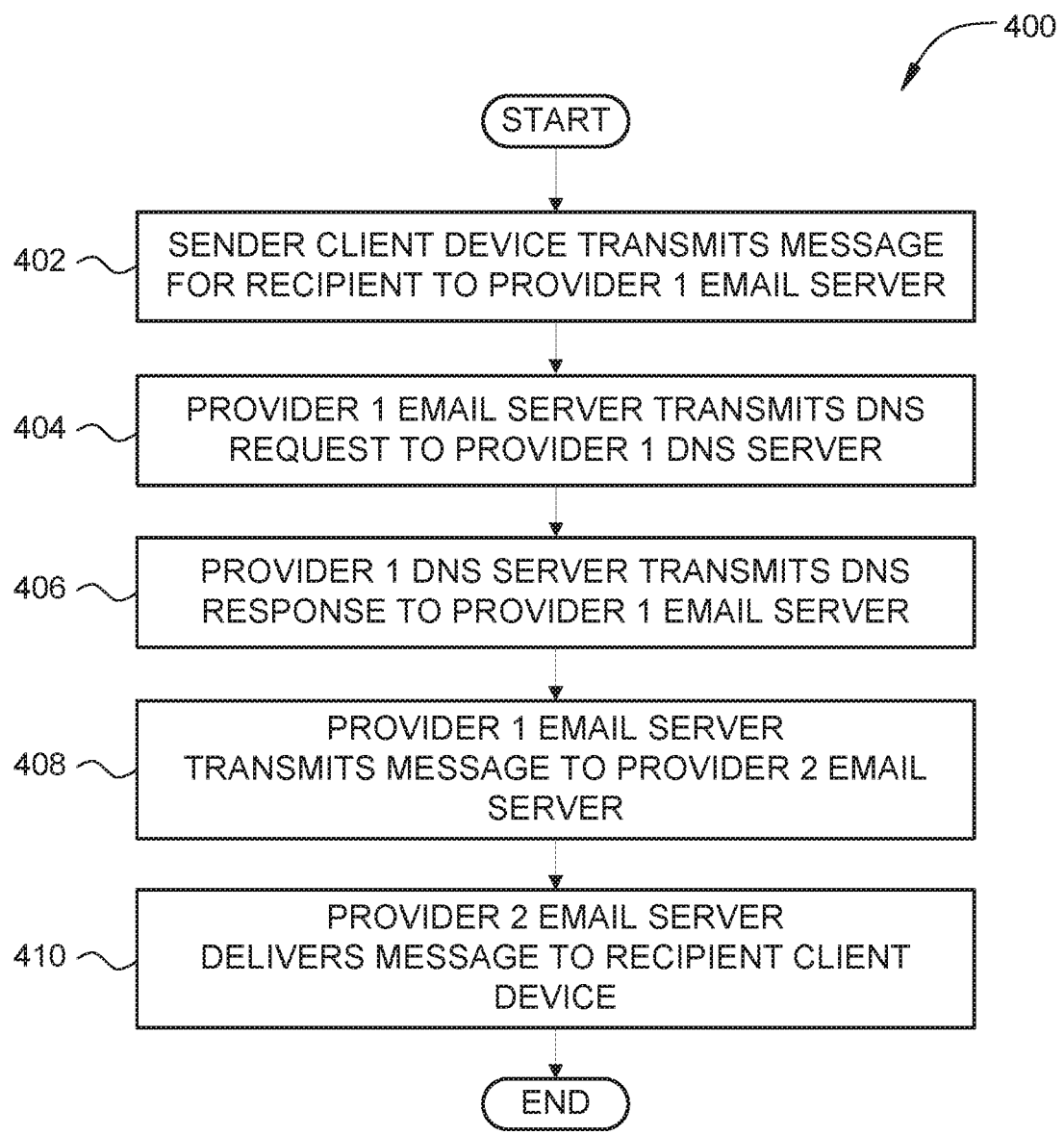
FIG. 4 is a flow diagram of method steps for transmitting an email message over a network, according to various embodiments.

FIG. 4 is a flow diagram of method steps for transmitting an email message over a network, according to various embodiments. Although the method steps are described in conjunction with the systems of FIGS. 1-3, persons of ordinary skill in the art will understand that the steps can be performed in any order by any system.

As shown, a method 400 begins at step 402, where sender client device 102(1) transmits a message, such as an email message, to provider 1 email server 104(1), where the message is directed to recipient@provider1_domain.tld. At step 404, provider 1 email server 104(1) transmits a DNS lookup request to provider 1 server 103 to resolve the email address for recipient@provider1_domain.tld. In some embodiments, provider 1 server 103 may be a DNS server.

At step 406, provider 1 server 103 transmits a DNS response to provider 1 email server 104(1). In so doing, an email forwarding application 232 executing on provider 1 server 103 searches for an MX record corresponding to the recipient. In particular, the email forwarding application 232 searches an MX record database 234 for a DNS zone file corresponding to the domain provider1_domain.tld. The email forwarding application 232 searches the DNS zone file for an MX record corresponding to the recipient. The MX record identifies a second domain name, such as provider2_domain.tld, corresponding to the recipient. Provider 1 server 103 then transmits the DNS response to provider 1 email server 104(1) based on the MX record corresponding to the recipient. The DNS response identifies the recipient and the second domain name corresponding to the recipient.

At step 408, provider 1 email server 104(1) transmits the message to provider 2 email server 104(2), where the message is directed to recipient@provider2_domain.tld. At step 410, provider 2 email server 104(2) delivers the message to recipient client device 102(2). The method 400 then terminates.

Figure 5:
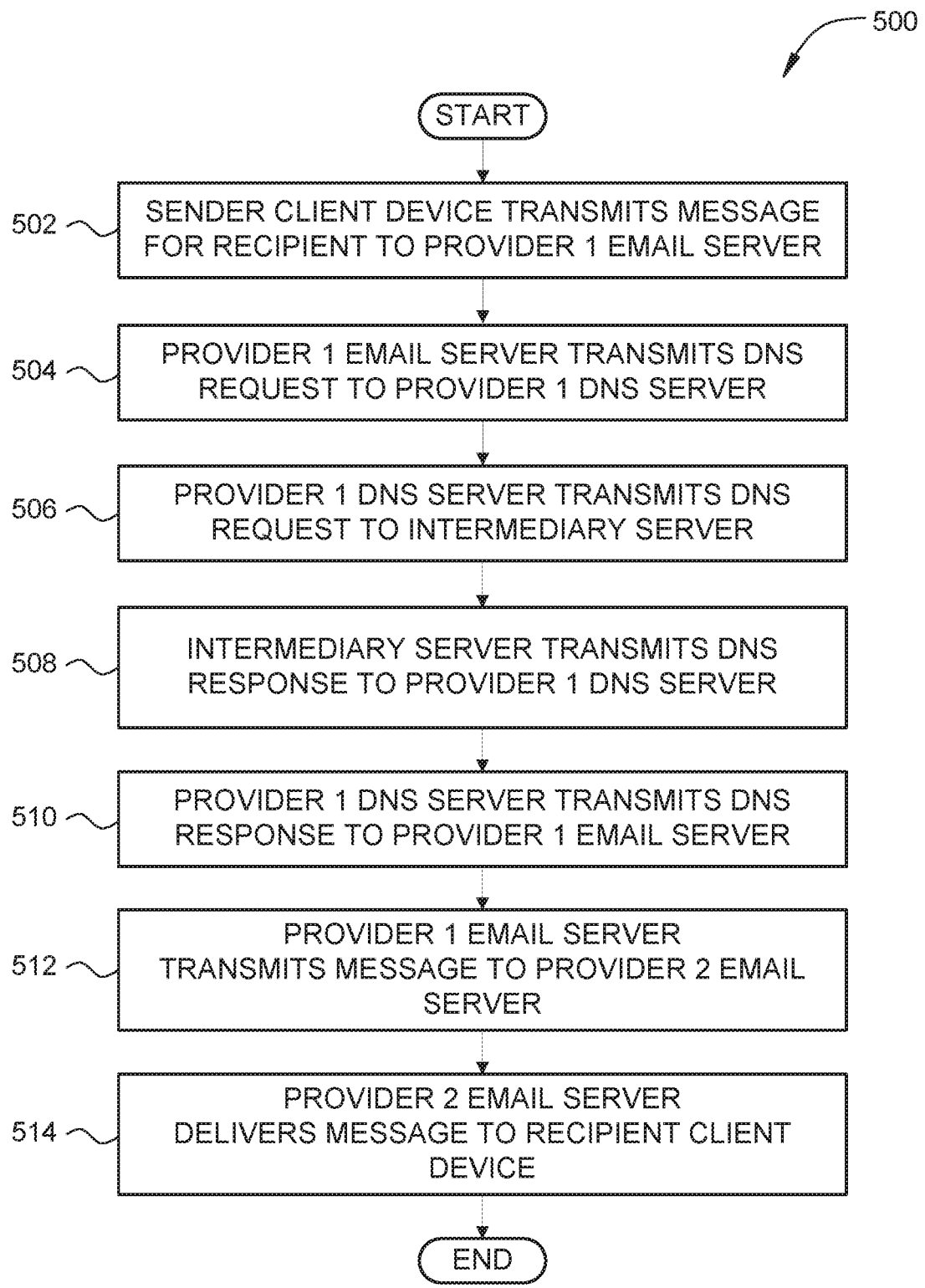
FIG. 5 is a flow diagram of method steps for transmitting an email message over a network, according to various embodiments.

FIG. 5 is a flow diagram of method steps for transmitting an email message over a network, according to various embodiments. Although the method steps are described in conjunction with the systems of FIGS. 1-3, persons of ordinary skill in the art will understand that the steps can be performed in any order by any system.

As shown, a method 500 begins at step 502, where sender client device 102(1) transmits a message, such as an email message, to provider 1 email server 104(1), where the message is directed to recipient@provider1_domain.tld. At step 504, provider 1 email server 104(1) transmits a DNS lookup request to provider 1 server 103 to resolve the email address for recipient@provider1_domain.tld. In some embodiments, provider 1 server 103 may be a DNS server.

At step 506, provider 1 server 103 transmits a DNS lookup request to intermediary server 106. In some embodiments, intermediary server 106 may be a DNS server. In so doing, an email forwarding application 232 executing on provider 1 server 103 searches for an MX record corresponding to the recipient. In particular, the email forwarding application 232 searches an MX record database 234 for a DNS zone file corresponding to the domain provider1_domain.tld. The email forwarding application 232 searches the DNS zone file for an MX record corresponding to the recipient. The MX record identifies an intermediary corresponding to the recipient. Provider 1 server 103 then transmits a DNS lookup request to intermediary server 106 based on the MX record corresponding to the recipient.

At step 508, an intermediary forwarding application 332 executing on the intermediary server 106 transmits a DNS response to provider 1 server 103. The DNS response identifies that the message directed to recipient@ provider1_domain.tld should be redirected to recipient@provider2_domain.tld. In so doing, the intermediary forwarding application 332 searches a forwarding database 334 for a record corresponding to recipient@ provider1_domain.tld. The record corresponding to recipient@provider1_domain.tld identifies a second provider for the recipient, such as provider2_domain.tld.

At step 510, the email forwarding application 232 executing on provider 1 server 103 transmits a DNS response to provider 1 email server 104(1). The DNS response likewise identifies that the message directed to recipient@provider1_domain.tld should be redirected to recipient@provider2_domain.tld. At step 512, provider 1 email server 104(1) transmits the message to provider 2 email server 104(2), where the message is directed to recipient@provider2_domain.tld. At step 514, provider 2 email server 104(2) delivers the message to recipient client device 102(2). The method 500 then terminates.

Figure 6:
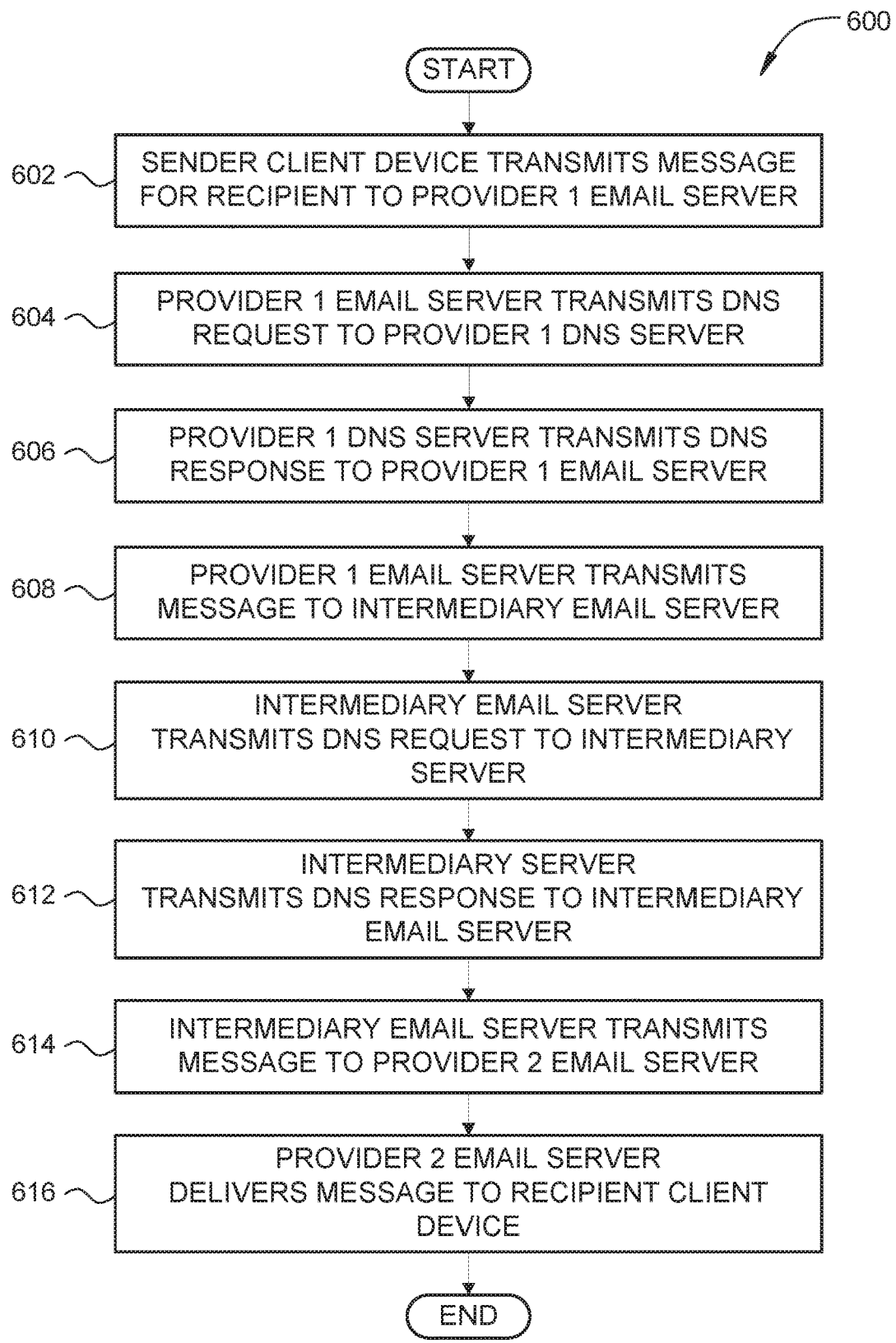
FIG. 6 is a flow diagram of method steps for transmitting an email message over a network, according to various embodiments.

FIG. 6 is a flow diagram of method steps for transmitting an email message over a network, according to various embodiments. Although the method steps are described in conjunction with the systems of FIGS. 1-3, persons of ordinary skill in the art will understand that the steps can be performed in any order by any system.

As shown, a method 600 begins at step 602, where sender client device 102(1) transmits a message, such as an email message, to provider 1 email server 104(1), where the message is directed to recipient@provider1_domain.tld. At step 604, provider 1 email server 104(1) transmits a DNS lookup request to provider 1 server 103 to resolve the email address for recipient@provider1_domain.tld. In some embodiments, provider 1 server 103 may be a DNS server.

At step 606, provider 1 server 103 transmits a DNS response to provider 1 email server 104(1). In so doing, an email forwarding application 232 executing on provider 1 server 103 searches for an MX record corresponding to the recipient. In particular, the email forwarding application 232 searches an MX record database 234 for a DNS zone file corresponding to the domain provider1_domain.tld. The email forwarding application 232 searches the DNS zone file for an MX record corresponding to the recipient. The MX record identifies an intermediary corresponding to the recipient. Provider 1 server 103 then transmits the DNS response to provider 1 email server 104(1) based on the MX record corresponding to the recipient. The DNS response identifies the recipient and the intermediary corresponding to the recipient.

At step 608, provider 1 email server 104(1) transmits the message to intermediary email server 107. At step 610, intermediary email server 107 transmits a DNS lookup request to intermediary server 106 to resolve the email address for recipient@provider1_domain.tld. In some embodiments, intermediary server 106 may be a DNS server. At step 612, an intermediary forwarding application 332 executing on the intermediary server 106 transmits a DNS response to intermediary email server 107. The DNS response identifies that the message directed to recipient@provider1_domain.tld should be redirected to recipient@provider2_domain.tld. In so doing, the intermediary forwarding application 332 searches a forwarding database 334 for a record corresponding to recipient@ provider1_domain.tld. The record corresponding to recipient@provider1_domain.tld identifies a second provider for the recipient, such as provider2_domain.tld.

At step 614, intermediary email server 107 transmits the message to provider 2 email server 104(2), where the message is directed to recipient@provider2_domain.tld. At step 616, provider 2 email server 104(2) delivers the message to recipient client device 102(2). The method 600 then terminates.

Figure 7A:
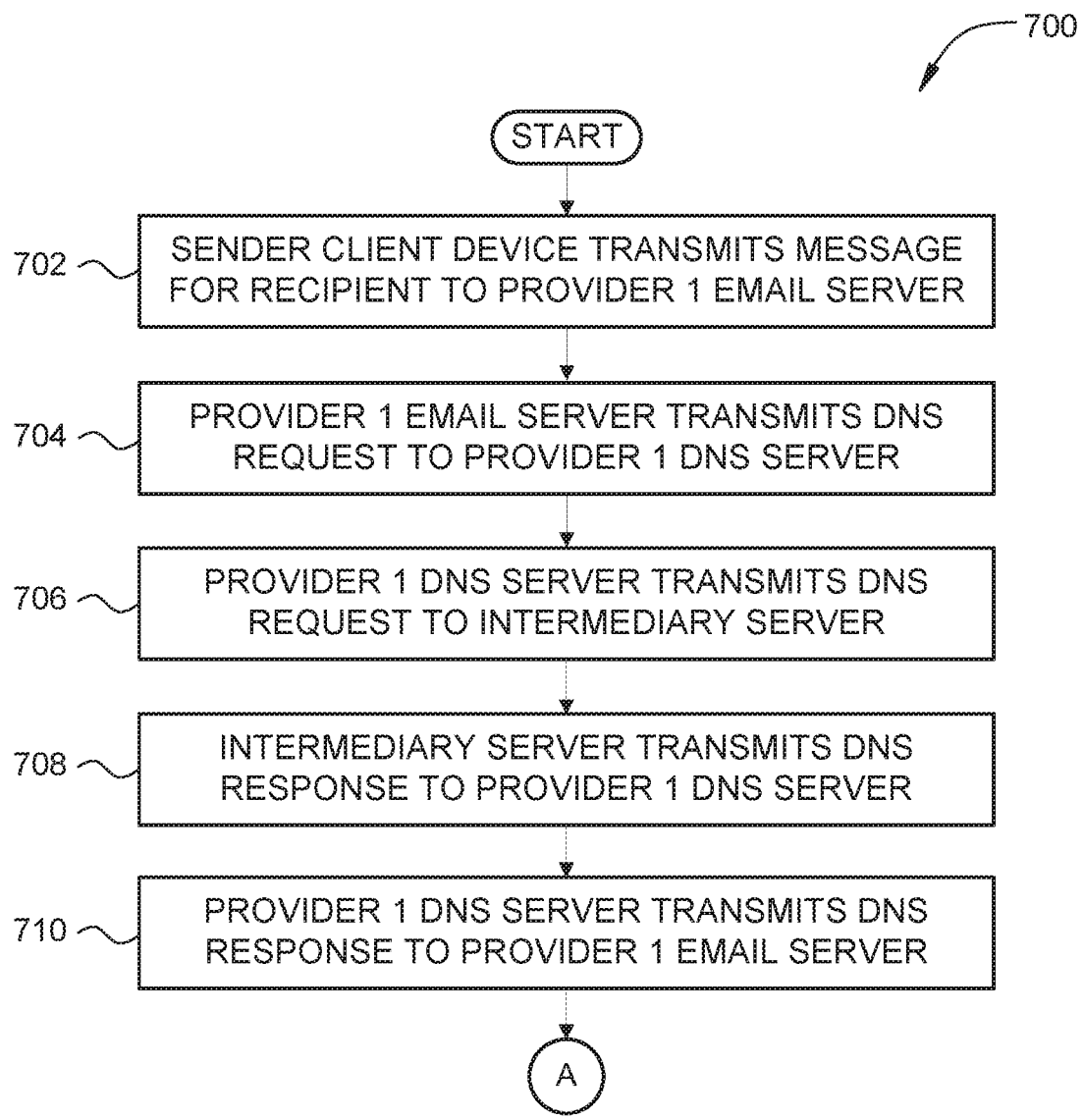
FIGS. 7A-7B set forth a flow diagram of method steps for transmitting an email message over a network, according to various embodiments.
Figure 7B:
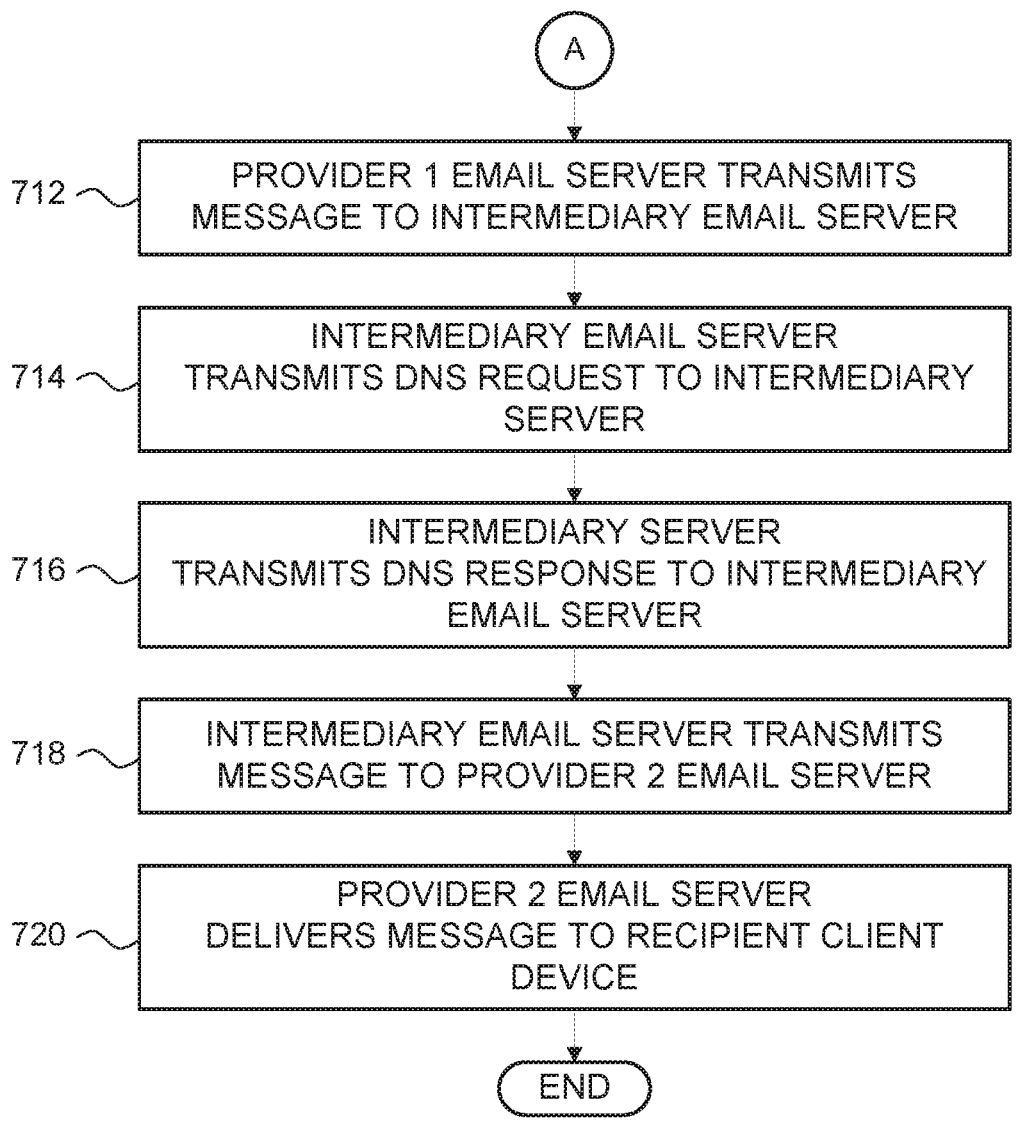

FIGS. 7A-7B set forth a flow diagram of method steps for transmitting an email message over a network, according to various embodiments. Although the method steps are described in conjunction with the systems of FIGS. 1-3, persons of ordinary skill in the art will understand that the steps can be performed in any order by any system.

As shown, a method 700 begins at step 702, where sender client device 102(1) transmits a message, such as an email message, to provider 1 email server 104(1), where the message is directed to recipient@provider1_domain.tld. At step 704, provider 1 email server 104(1) transmits a DNS lookup request to provider 1 server 103 to resolve the email address for recipient@provider1_domain.tld. In some embodiments, provider 1 server 103 may be a DNS server.

At step 706, provider 1 server 103 transmits a DNS lookup request to intermediary server 106. In some embodiments, intermediary server 106 may be a DNS server. In so doing, an email forwarding application 232 executing on provider 1 server 103 searches for an MX record corresponding to the recipient. In particular, the email forwarding application 232 searches an MX record database 234 for a DNS zone file corresponding to the domain provider1_domain.tld. The email forwarding application 232 searches the DNS zone file for an MX record corresponding to the recipient. The MX record identifies an intermediary corresponding to the recipient. Provider 1 server 103 then transmits a DNS lookup request to intermediary server 106 based on the MX record corresponding to the recipient.

At step 708, an intermediary forwarding application 332 executing on the intermediary server 106 transmits a DNS response to provider 1 server 103. The DNS response identifies that the message directed to recipient@provider1_domain.tld should be redirected to recipient@intermediary_domain.tld. In so doing, the intermediary forwarding application 332 searches a forwarding database 334 for a record corresponding to recipient@provider1_domain.tld. The record corresponding to recipient@provider1_domain.tld identifies an intermediary for the recipient, such as intermediary_domain.tld. At step 710, the email forwarding application 232 executing on provider 1 server 103 transmits a DNS response to provider 1 email server 104(1). The DNS response likewise identifies that the message directed to recipient@ provider1_domain.tld should be redirected to recipient@ intermediary_domain.tld.

At step 712, provider 1 email server 104(1) transmits the message to intermediary email server 107. At step 714, intermediary email server 107 transmits a DNS lookup request to intermediary server 106 to resolve the email address for recipient@intermediary_domain.tld. At step 716, the intermediary forwarding application 332 executing on the intermediary server 106 transmits a DNS response to intermediary email server 107. The DNS response identifies that the message directed to recipient@ intermediary_domain.tld should be redirected to recipient@ provider2_domain.tld. In so doing, the intermediary forwarding application 332 searches a forwarding database 334 for a record corresponding to recipient@ intermediary_domain.tld. The record corresponding to recipient@ intermediary_domain.tld identifies a second provider for the recipient, such as provider2_domain.tld.

At step 718, intermediary email server 107 transmits the message to provider 2 email server 104(2), where the message is directed to recipient@provider2_domain.tld. At step 720 provider 2 email server 104(2) delivers the message to recipient client device 102(2). The method 700 then terminates.

In sum, techniques are disclosed for providing forwarding services for messages, such as email messages, directed to a recipient. The techniques provide the forwarding services via MX records in a DNS zone file. In a first technique, a sender client device transmits a message for a recipient to an email server for a first provider associated with a first domain. The email server for the first provider transmits a DNS lookup request to a DNS server for the first provider. The DNS lookup request includes a request to resolve an email address associated with the recipient, where the email address is directed to the first domain. The DNS server for the first provider searches a DNS zone file corresponding to the first domain for an MX record associated with the recipient. The MX record identifies a second domain associated with the recipient. The DNS server for the first provider transmits a DNS response to the email server for the first provider, where the DNS response identifies the second domain. The email server for the first provider transmits the message to the email server for the second provider, where the second provider is associated with the second domain. The email server for the second provider transmits the message to the recipient client device.

In a second technique, a sender client device transmits a message for a recipient to an email server for a first provider associated with a first domain. The email server for the first provider transmits a DNS lookup request to a DNS server for the first provider. The DNS lookup request includes a request to resolve an email address associated with the recipient, where the email address is directed to the first domain. The DNS server for the first provider searches a DNS zone file corresponding to the first domain for an MX record associated with the recipient. The MX record identifies an intermediary associated with the recipient. The DNS server for the first provider transmits a DNS lookup request to a DNS server associated with the intermediary. The DNS server associated with the intermediary transmits a DNS response to the DNS server for the first provider, where the DNS response identifies the second domain. The DNS server for the first provider transmits a DNS response to the email server for the first provider, where the DNS response identifies the second domain. The email server for the first provider transmits the message to the email server for the second provider, where the second provider is associated with the second domain. The email server for the second provider transmits the message to the recipient client device.

In a third technique, a sender client device transmits a message for a recipient to an email server for a first provider associated with a first domain. The email server for the first provider transmits a DNS lookup request to a DNS server for the first provider. The DNS lookup request includes a request to resolve an email address associated with the recipient, where the email address is directed to the first domain. The DNS server for the first provider searches a DNS zone file corresponding to the first domain for an MX record associated with the recipient. The MX record identifies an intermediary associated the recipient. The DNS server for the first provider transmits a DNS response to the email server for the first provider, where the DNS response identifies the intermediary.

The email server for the first provider transmits the message to an email server associated with the intermediary. The email server associated with the intermediary transmits a DNS lookup request to the DNS server associated with the intermediary. The DNS server associated with the intermediary transmits a DNS response to the email server associated with the intermediary, where the DNS response identifies a second domain associated with the recipient. The email server associated with the intermediary transmits the message to the email server for the second provider, where the second provider is associated with the second domain. The email server for the second provider transmits the message to the recipient client device.

In a fourth technique, a sender client device transmits a message for a recipient to an email server for a first provider associated with a first domain. The email server for the first provider transmits a DNS lookup request to a DNS server for the first provider. The DNS lookup request includes a request to resolve an email address associated with the recipient, where the email address is directed to the first domain. The DNS server for the first provider searches a DNS zone file corresponding to the first domain for an MX record associated with the recipient. The MX record identifies an intermediary associated with the recipient. The DNS server for the first provider transmits a DNS lookup request to a DNS server associated with the intermediary. The DNS server associated with the intermediary transmits a DNS response to the DNS server for the first provider, where the DNS response identifies the intermediary. The DNS server for the first provider transmits a DNS response to the email server for the first provider, where the DNS response identifies the intermediary.

The email server for the first provider transmits the message to an email server associated with the intermediary. The email server associated with the intermediary transmits a DNS lookup request to the DNS server associated with the intermediary. The DNS server associated with the intermediary transmits a DNS response to the email server associated with the intermediary, where the DNS response identifies a second domain associated with the recipient. The email server associated with the intermediary transmits the message to the email server for the second provider, where the second provider is associated with the second domain.

The email server for the second provider transmits the message to the recipient client device.

At least one advantage of at least one of the disclosed techniques is that an email address associated with a particular subscriber and intended recipient of email communications services does not need to change when that subscriber changes from a first email services provider to a second email services provider. Accordingly, the subscriber does not need to advise other subscribers of a change in email address when the subscriber switches email services providers. Among other things, email messages that are transmitted to the email address associated the first email service provider are received by the subscriber, even though the subscriber has switched to the second email service provider. Notably, at least one of the disclosed techniques helps ensure that email messages transmitted to the email address associated the first email service provider are not routed to an unintended recipient, thereby improving privacy and addressing data security concerns surrounding email communications.

1. In some embodiments, a method for transmitting an email message over a network comprises receiving a first request from a first device within the network to resolve an email address of an email recipient, wherein the email address is associated with a first domain, determining that the email recipient is associated with a second domain, and transmitting, to the first device, a first response to the first request that identifies the email recipient and the second domain.

2. The method of clause 1, wherein, upon receiving the first response to the first request, the first device transmits the email message to an email server associated with the second domain.

3. The method of clause 1 or 2, wherein determining that the email recipient is associated with the second domain comprises transmitting, to an intermediary server, a second request to resolve the email address of the email recipient, and receiving, from the intermediary server, a second response to the second request that identifies the email recipient and the second domain.

4. The method of any of clauses 1-3, wherein, upon receiving the first response to the first request, the first device transmits a second response to a second device, wherein the second response identifies the email recipient and the second domain.

5. The method of any of clauses 1-4, wherein, upon receiving the second response, the second device transmits the email message to an email server associated with the second domain.

6. The method of any of clauses 1-5, wherein, upon receiving the first response to the first request, the first device transmits the email message to a second device.

7. The method of any of clauses 1-6, wherein the second device transmits, to an intermediary server, a second request to resolve the email address of the email recipient associated with the first domain, and receives, from the intermediary server, a second response to the second request that identifies the email recipient and a third domain associated with the email recipient.

8. The method of any of clauses 1-7, wherein the second device further transmits the email message to an email server associated with the third domain.

9. The method of any of clauses 1-8, wherein the first device comprises an intermediary email server, and the first device receives the email message from a first email server associated with the first domain.

10. The method of any of clauses 1-9, further comprising receiving a second request from a second device within the network to resolve the email address of the email recipient, determining that the email recipient is associated with a third domain, and transmitting, to the second device, a second response to the second request that identifies the email recipient and the third domain.

11. In some embodiments, a non-transitory computer-readable storage medium including instructions that, when executed by a processor, cause the processor to transmit an email message over a network, by performing the steps of receiving a first request from a first device within the network to resolve an email address of an email recipient, wherein the email address is associated with a first domain, determining that the email recipient is associated with a second domain, and transmitting, to the first device, a first response to the first request that identifies the email recipient and the second domain.

12. The non-transitory computer-readable storage medium of clause 11, wherein, upon receiving the first response to the first request, the first device transmits the email message to an email server associated with the second domain.

13. The non-transitory computer-readable storage medium of clause 11 or 12, wherein determining that the email recipient is associated with the second domain comprises transmitting, to an intermediary server, a second request to resolve the email address of the email recipient, and receiving, from the intermediary server, a second response to the second request that identifies the email recipient and the second domain.

14. The non-transitory computer-readable storage medium of any of clauses 11-13, wherein, upon receiving the first response to the first request, the first device transmits the email message to a second device.

15. The non-transitory computer-readable storage medium of any of clauses claim 11-14, wherein the second device transmits, to an intermediary server, a second request to resolve the email address of the email recipient associated with the first domain, and receives, from the intermediary server, a second response to the second request that identifies the email recipient and a third domain associated with the email recipient.

16. The non-transitory computer-readable storage medium of any of clauses claim 11-15, further comprising receiving a second request from a second device within the network to resolve the email address of the email recipient, determining that the email recipient is associated with a third domain, and transmitting, to the second device, a second response to the second request that identifies the email recipient and the third domain.

17. In some embodiments, a computing device comprises a memory that includes an email forwarding application, and a processor that is coupled to the memory and, when executing the email forwarding application, is configured for receiving a domain name system (DNS) request to resolve an email address of an email recipient, wherein the email address is associated with a first domain, determining that the email recipient is associated with a second domain, and transmitting, to a client device within a network, a DNS response to the DNS request that identifies the email recipient and the second domain.

18. The computing device of clause 17, wherein the computing device comprises an intermediary server included in a plurality of intermediary servers, and each intermediary server included in the plurality of intermediary servers is configured to resolve the email address of the email recipient.

19. The computing device of clauses 17 or 18, wherein determining that the email recipient is associated with the second domain comprises searching a domain name system (DNS) zone file for a record that identifies the email recipient and the first domain, determining that the record further identifies the second domain, and retrieving a name associated with the second domain from the record.

20. The computing device of any of clauses 17-19, wherein determining that the email recipient is associated with a second domain comprises searching a forwarding database for a record that identifies the email recipient and the first domain, determining that the record further identifies the second domain, and retrieving a name associated with the second domain from the record.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for transmitting an email message over a network, the method comprising:
   receiving, by a first domain name system (DNS) server from a first device within the network, a first request to resolve a first email address of an email recipient of a message, wherein:
      the first email address is a destination for the message, and
      the first email address is associated with a first domain that is associated with the first DNS server and a first email server;
   determining, by the first DNS server, that the first email address is mapped to a second email address that is associated with a second domain; and
   transmitting, by the first DNS server to the first email server, a first DNS response to the first request that identifies the second email address as the destination for the message.

2. The method of claim 1, wherein, upon receiving the first DNS response to the first request, the first email server transmits a second request to an intermediate email server.

3. The method of claim 2, wherein the intermediate email server:
   transmits, to an intermediary server, a second request to resolve the second email address; and
   receives, from the intermediary server, a second DNS response to the second request that identifies a third email address that is associated with a third domain.

4. The method of claim 3, wherein the intermediate email server further transmits the message to an email server associated with a third domain that is associated with the third email address.

5. The method of claim 1, wherein, upon receiving the first DNS response to the first request, the first email server transmits the message to a second email server that is associated with the second domain.

6. The method of claim 1, wherein determining that the first email address is mapped to a second email address that is associated with the second domain comprises:
- transmitting, by the first DNS server to an intermediary server, a second request to resolve the first email address; and
- receiving, by the first DNS server from the intermediary server, a response to the second request that identifies the second email address,
- wherein the intermediary server retrieves a record that includes a mapping of the first email address to the second email address.

7. The method of claim 1, wherein determining that the first email address is mapped to a second email address that is associated with a second domain comprises:
- searching a DNS zone file for a record that includes the first email address;
- determining that the record includes a mapping of the first email address to the second email address; and
- retrieving, from the record, a name associated with the second domain.

8. The method of claim 1, wherein determining that the first email address is mapped to a second email address that is associated with a second domain comprises:
- searching a forwarding database for a record that includes the first email address;
- determining that the record includes a mapping of the first email address to the second email address; and
- retrieving, from the record, a name associated with the second domain.

9. One or more non-transitory computer-readable storage media including instructions that, when executed by one or more processors, cause the one or more processors to transmit an email message over a network by performing the steps of:
- receiving, by a first domain name system (DNS) server from a first device within the network, a first request to resolve a first email address of an email recipient of a message, wherein:
  - the first email address is a destination for the message, and
  - the first email address is associated with a first domain that is associated with the first DNS server and a first email server;
- determining, by the first DNS server, that the first email address is mapped to a second email address that is associated with a second domain; and
- transmitting, by the first DNS server to the first email server, a first DNS response to the first request that identifies the second email address as the destination for the message.

10. The one or more non-transitory computer-readable storage media of claim 9, wherein, upon receiving the first DNS response to the first request, the first email server transmits a second request to an intermediate email server.

11. The one or more non-transitory computer-readable storage media of claim 10, the intermediate email server:
- transmits, to an intermediary server, a second request to resolve the second email address; and
- receives, from the intermediary server, a second DNS response to the second request that identifies a third email address that is associated with a third domain.

12. The one or more non-transitory computer-readable storage media of claim 9, wherein, upon receiving the first DNS response to the first request, the first email server transmits the message to a second email server that is associated with the second domain.

13. The one or more non-transitory computer-readable storage media of claim 9, wherein determining that the first email address is mapped to a second email address that is associated with the second domain comprises:
- transmitting, by the first DNS server to an intermediary server, a second request to resolve the first email address; and
- receiving, by the first DNS server from the intermediary server, a response to the second request that identifies the second email address,
- wherein the intermediary server retrieves a record that includes a mapping of the first email address to the second email address.

14. The one or more non-transitory computer-readable storage media of claim 9, wherein determining that the first email address is mapped to a second email address that is associated with a second domain comprises:
- searching a DNS zone file for a record that includes the first email address;
- determining that the record includes a mapping of the first email address to the second email address; and
- retrieving, from the record, a name associated with the second domain.

15. The one or more non-transitory computer-readable storage media of claim 9, wherein determining that the first email address is mapped to a second email address that is associated with a second domain comprises:
- searching a forwarding database for a record that includes the first email address;
- determining that the record includes a mapping of the first email address to the second email address; and
- retrieving, from the record, a name associated with the second domain.

16. A computing device, comprising:
- a memory that includes an email forwarding application; and
- a processor that is coupled to the memory and, when executing the email forwarding application, performs the steps of:
  - receiving, from a first email server within a network, a domain name system (DNS) request to resolve a first email address of an email recipient of a message, wherein:
    - the first email address is a destination for the message, and
    - the first email address is associated with a first domain that is associated with the computing device and the first email server;
  - determining that the first email address is mapped to a second email address that is associated with a second domain; and
  - transmitting, to the first email server, a DNS response to the DNS request that identifies the second email address as the destination for the message.

17. The computing device of claim 16, wherein determining that the first email address is mapped to a second email address that is associated with a second domain comprises:
- searching a DNS zone file for a record that includes the first email address;

determining that the record includes a mapping of the first email address to the second email address; and retrieving, from the record, a name associated with the second domain.

18. The computing device of claim 17, wherein the DNS zone file is stored in the memory.

19. The computing device of claim 16, wherein the processor further performs the steps of:

transmitting, to an intermediary server included in a plurality of intermediary servers, a second request to resolve the first email address; and receiving, from the intermediary server, a response to the second request that identifies the second email address, wherein each intermediary server included in the plurality of intermediary servers is configured to resolve the first email address.

20. The computing device of claim 16, determining that the first email address is mapped to a second email address that is associated with a second domain comprises:

searching a forwarding database for a record that includes the first email address;

determining that the record includes a mapping of the first email address to the second email address; and retrieving, from the record, a name associated with the second domain.

\* \* \* \* \*